United States Patent [19]
Anjan et al.

[11] Patent Number: 5,224,977
[45] Date of Patent: Jul. 6, 1993

[54] METHOD AND APPARATUS FOR FABRICATION OF POLARIZATION MAINTAINING FUSED COUPLERS

[75] Inventors: Yellapu Anjan; Sam Habbel, both of Scottsdale; Joseph F. Straceski, Phoenix, all of Ariz.

[73] Assignee: Honeywell Inc., Minneapolis, Minn.

[21] Appl. No.: 805,337

[22] Filed: Dec. 9, 1991

[51] Int. Cl.⁵ .......................................... C03B 37/023
[52] U.S. Cl. .................................. 65/4.21; 65/29; 65/42; 65/63; 65/152; 65/155; 65/162
[58] Field of Search .............. 65/3.11, 4.2, 4.21, 65/29, 160, 162, 36, 42, 63, 152, 155, 268, 2

[56] References Cited

U.S. PATENT DOCUMENTS

| | | |
|---|---|---|
| 4,482,203 | 11/1984 | Stowe et al. |
| 4,591,372 | 5/1986 | Bricheno et al. ............ 65/4.2 |
| 4,714,316 | 12/1987 | Moore et al. |
| 4,763,272 | 8/1988 | McLandrich ............ 65/4.2 X |
| 4,765,816 | 8/1988 | Bjornlie ............ 65/3.11 X |
| 4,801,185 | 1/1989 | Bricheno . |
| 4,820,321 | 4/1989 | Presby ............ 65/2 |
| 4,895,423 | 1/1990 | Bilodeau et al. ............ 65/4.2 X |
| 4,932,740 | 6/1990 | Berkey et al. . |
| 4,992,122 | 2/1991 | Rayit ............ 156/158 |
| 4,997,247 | 3/1991 | Stowe . |

*Primary Examiner*—Robert L. Lindsay
*Attorney, Agent, or Firm*—Mark J. Gebhardt

[57] ABSTRACT

A fiber optic polarization maintaining apparatus for use in fabrication of fused optical couplers, where the fused optical couplers include first and second optical fibers. The apparatus includes apparatus for holding the first and second optical fibers in a first predetermined alignment where the first and second fibers each include a stripped portion and where the stripped portions are held in contact along their length. Apparatus for heating the first and second optical fibers are located adjacent the holding apparatus wherein the heating apparatus is brushed across the length of the first and second fibers so as to oscillate across the fibers in an amplitude varied in an ever decreasing stepped manner until fusion of the fibers is complete.

15 Claims, 11 Drawing Sheets

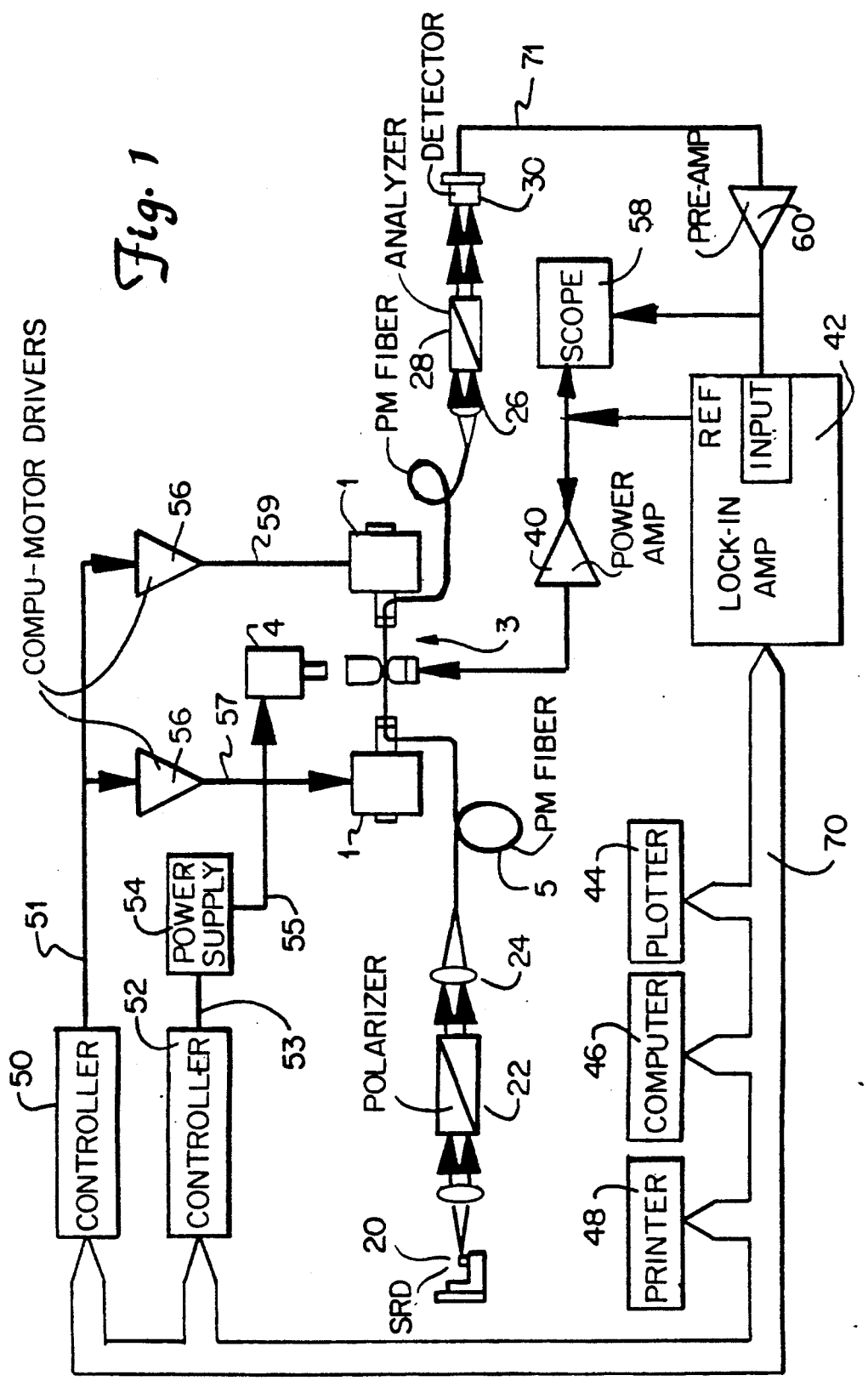

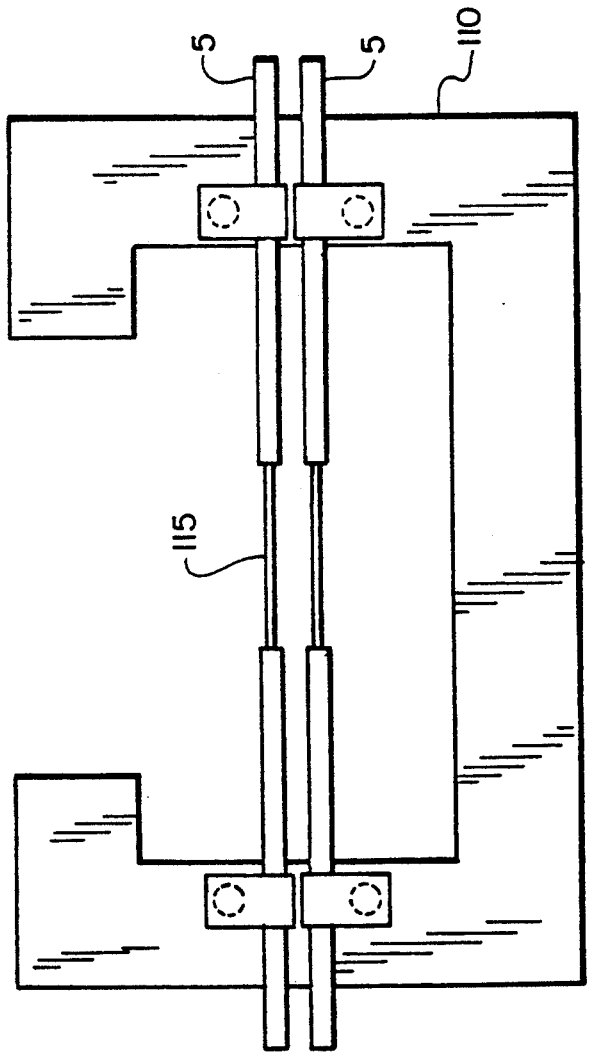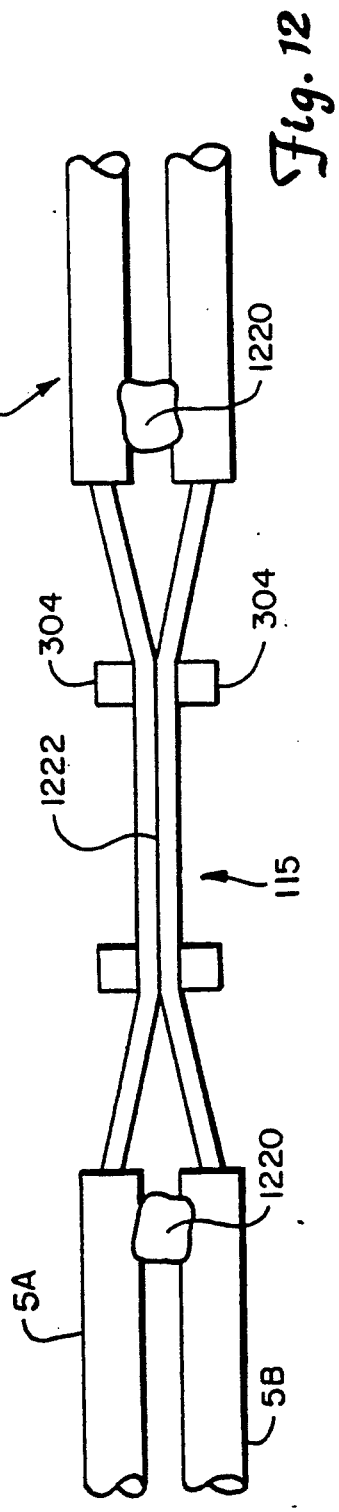

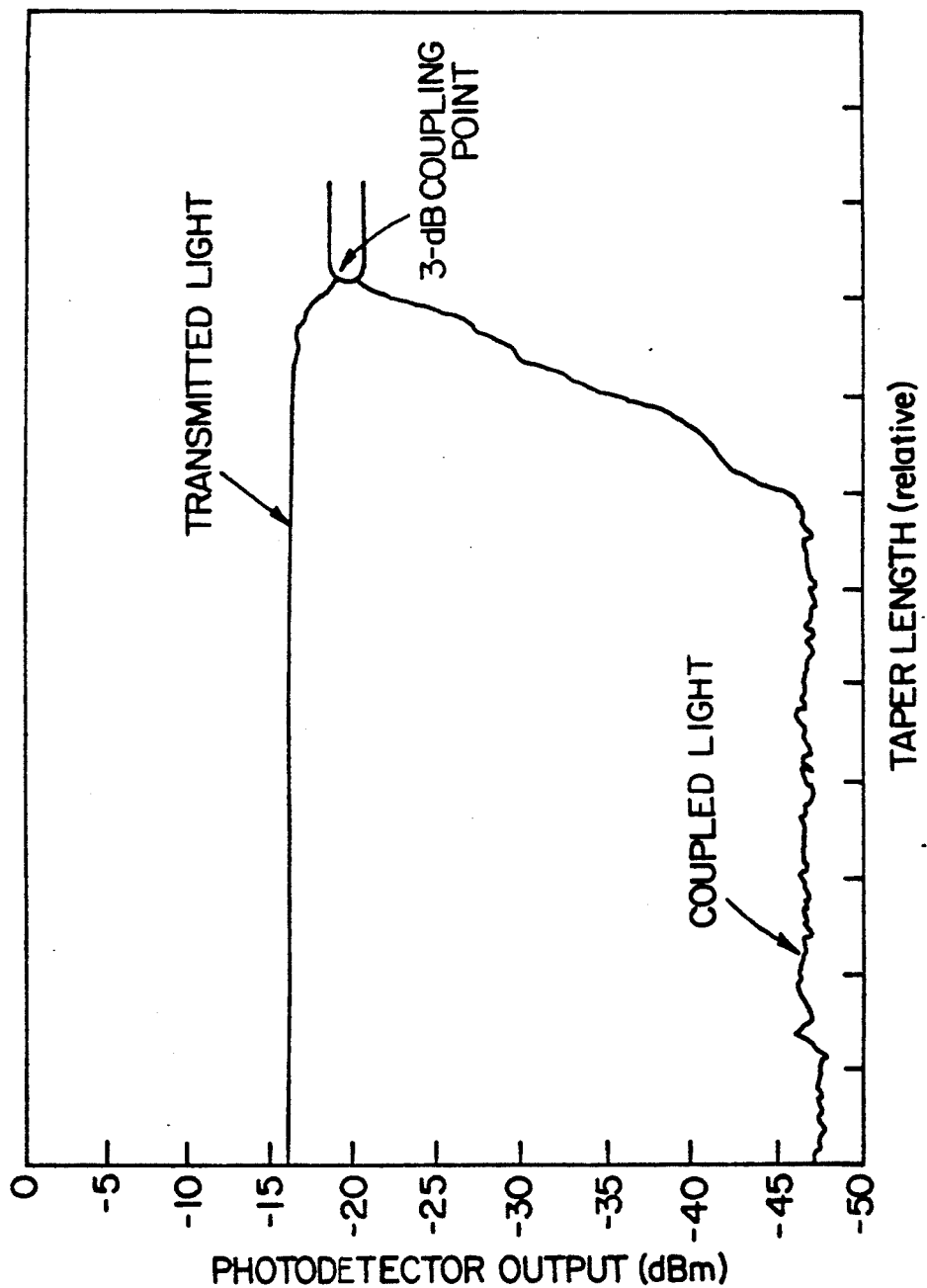

METHOD AND APPARATUS FOR FABRICATION OF POLARIZATION MAINTAINING FUSED COUPLERS

FIELD OF INVENTION

This invention relates to apparatus for fabricating fiber optic polarization maintaining fused couplers. More particularly, this invention relates to the fabrication of 30 mm long polarization maintaining fused optical couplers.

BACKGROUND OF THE INVENTION

Polarization maintaining (PM) fiber optic single mode couplers are critical components for both interferometric and resonator type i fiber-optic gyroscopes (FOG's). In a 2×2 PM coupler, light launched along either of the principal axes of a fiber is split into two parts as the output. The quality of a PM coupler is judged by the amount of additional loss it introduces and by its capability to maintain the polarization state launched at the input end. There are two ways of fabricating couplers: mechanical-lapped type, and fused-tapered type. In both the methods aligning of birefringent principal axes of the two fibers forming the coupler is necessary. The mechanical-lapped type involves embedding an unjacketed fiber in a grooved quartz block and mechanically lapping and polishing the block until the fiber core is reached. Two such blocks are bonded together to form a coupler. Low excess loss, high extinction ratio lapped PM couplers have been demonstrated but typically maintain such performance only over a limited temperature range. In addition, lapped coupler fabrication is labor intensive and time consuming making production quite expensive.

The fuse-tapered couplers, on the other hand, are fabricated by fusing a section of two fibers and stretching them until the required power splitting ratio is reached. The fabrication of single mode fused PM couplers involves alignment of birefringent axes of the fibers in addition to fusion and tapering of fibers. Since fusion and tapering produces a single piece of glass in the coupling region, fused couplers generally perform better over environment than do lapped ones. Ease of fabrication also offers significant production cost reductions over lapped couplers.

Maintaining the polarization through the coupling region requires accurate alignment of the fibers prior to fusion and tapering. Any advertently caused misalignment during fusion must be kept low by locally heating the fibers at the line of contact. The key to successfully making fused PM couplers is the apparatus and tooling needed for alignment, fusion and tapering. Also, attainment of high performance PM fused couplers requires the index of the birefringent stress members to be fairly matched with that of the cladding and the use of small (about 80 $\mu$m) cladding diameter fiber.

Using the apparatus and tooling, which are described in detail below, packaged fused PM couplers as short as 25mm in length 2.5mm in diameter are produced. Typically the extinction ratios of the couplers are better then 20 dB in both the through and coupled output ports, and the excess losses are less than 0.5dB.

SUMMARY OF THE INVENTION

The present invention provides an apparatus for the fabrication of polarization-maintaining fused fiber optic couplers, where the fused optical couplers include first and second optical fibers. The apparatus includes apparatus for holding the first and second optical fibers in a first predetermined alignment where the first and second fibers each include a stripped portion and where the stripped and cleaned portions are held in contact along their length. Apparatus for heating the first and second optical fibers are located adjacent the holding apparatus wherein the heating apparatus is brushed across the length of the first and second fibers so as to oscillate across the fibers in an amplitude varied in an ever decreasing stepped manner until fusion of the fibers is complete.

In one aspect of the invention a method and apparatus for automatically tapering a fused optical coupler is provided.

In another aspect of the invention a method for adjusting the extinction ratio in a fused optical coupler by rotating one of the fibers is provided.

It is an object of the present invention to provide an apparatus for consistently fabricating fiber optic PM fused couplers with yields of greater than 90%.

BRIEF DESCRIPTION OF THE DRAWINGS

The invention may be more easily understood in reference to the drawing wherein like numerals represent like elements.

FIG. 1 shows a schematic block diagram of the fiber alignment system.

FIG. 11 shows a rectangular frame fiber holding fixture used in the coupler fabrication system.

FIG. 12 shows the method of the invention to glue and push together jacketed fiber using the adjustable fiber holding fixture.

FIG. 13 shows a typical plot of the output power from the two fused and tapered fibers versus tapering length.

DESCRIPTION OF THE PREFERRED EMBODIMENT

Fiber Alignment System

Alignment of preferred birefringent axis of the coupler fiber is a precursor to the fusion-and-tapering process. Accurate alignment of the birefringent axes of the two fibers at the predetermined locations of fibers was accomplished with a computer controlled fiber alignment setup. The setup is capable of determining the slow or fast axis of the coupler fiber to better than 0.1 degree accuracy. The fibers are prepared for alignment by the following step by step procedure.

1. Stripping away 20mm length of the fiber jacket at the center of two fibers, each of which is 2 meters long.
2. Cleaning the stripped regions such that all contaminations and jell particles from the jacket are removed.

FIG. 1 shows a schematic diagram of the polarization-maintaining fiber alignment system, which is capable of determining the birefringent axis orientation to within 0.1 degree accuracy. Determination of the slow or fast axis of a PM fiber is based on the principle of elasto-optic effect described in Carrara et al.: "Elasto-optic alignment of birefringent axes in polarization-holding optical fiber", Optics Letters, Vol. 11, pp. 470–472 (1986).

Figure 1A:
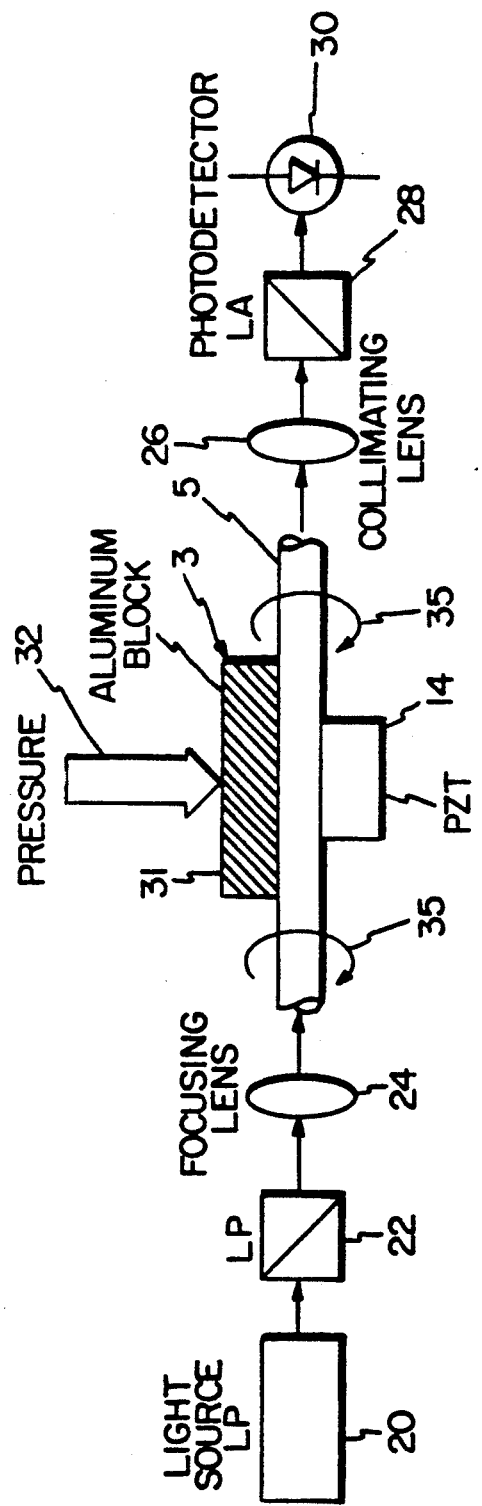
FIG. 1A shows a simplified schematic block diagram of the principle components of the fiber alignment system of the invention.

As shown in FIG. 1 and the simplified schematic block diagram of FIG. 1A, the polarization-maintaining fiber alignment system of the invention comprises a light source (20), a first polarizer (22), a focusing lens (24), a PZT squeezer (3), a collimating lens (26), an analyzer or second polarizer (28) and a photodetector (30). The PZT squeezer (3) further comprises a piezoelectric element (14) and an aluminum block (31). Pressure as indicated by arrow (32) is exerted through the aluminum block onto a fiber (5) which is rotated during processing as indicated generally by arrows (35).

Referring particularly now to FIG. 1, the fiber alignment system of the invention further includes controllers (50), (52), a power supply (54), first and second compu-motor drivers (56), a solenoid (4), and first and second stepper motors (1). A printer (48), computer (46) and plotter (44) communicate with each other, the controllers (50), (52) and the lock-in amplifier (42) through bus (70). The first controller (50) is operated by computer (46) to supply control signals (51) to the compu-motor drivers (56). The compu-motors, in turn, generate control signals (57), (59) to run the first and second stepper motors (1), respectively. The second controller (52) provides control signals (53) to the power supply (54) which then generates an AC modulation signal (55) to drive solenoid (4). An oscilloscope (58) may advantageously be connected to the output of pre-amp (60) and power amp (40) using a reference signal from lock-in amplifier (42) to monitor the process.

The light source (20) may advantageously comprise a super-radiant diode (SRD) which launches light along one of the principal axes of the fiber using a polarizer and a lens as shown in FIG. 1. The fiber is then passed through the PZT squeezer (3) which is modulated at 20 KHZ using an amplified signal obtained from lock-in amplifier (42) and power amplifier (40). The AC stress field resulting from the squeezer (3) modulates the birefringence of the fiber (5) and hence the state of polarization of light exiting the fiber (5). The exit beam is collimated and passed through a second polarizer (28) which is positioned 90 degrees to the polarized light passing through the unperturbed fiber that was not squeezed. The AC modulation of birefringence creates an intensity modulated beam which is synchronously detected with the photodetector (30) and the lock-in amplifier (42).

Figure 3:
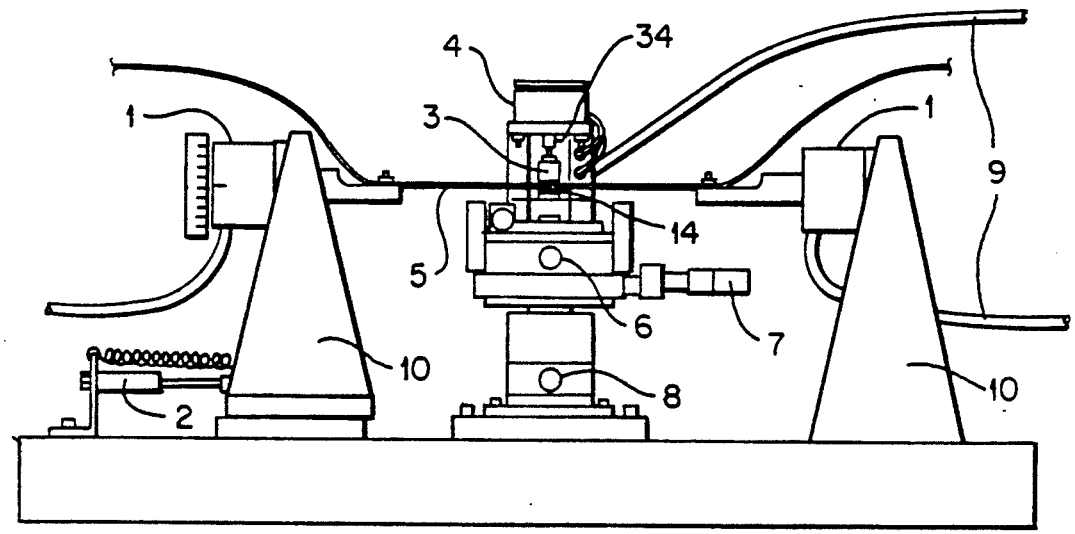
FIG. 3 shows assembled hardware needed for rotating and squeezing of the fiber alignment system.
Figures 4A, 4B:
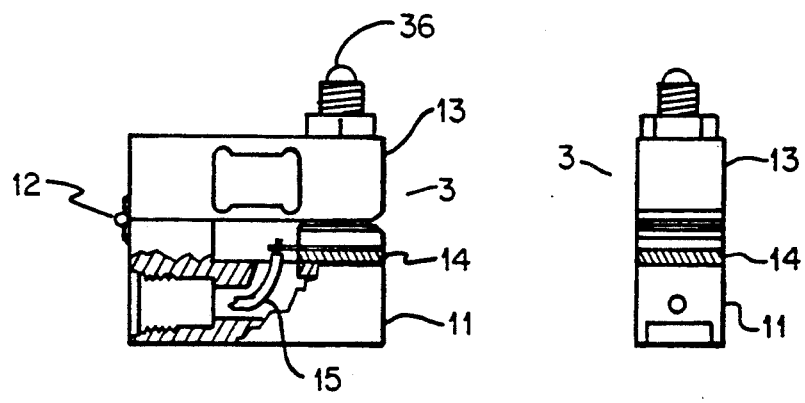
FIGS. 4A and 4B show a front and side view of the squeezer of the fiber alignment system.

The developed hardware for rotation and squeezing of the fiber (8) is shown in FIG. 3. The polarization-maintaining fiber (5) to be aligned is clamped in a pair of precision rotation stepper motors (1). The resolution of the motors is 0.014 degrees per step. One of the motor mounted pedestals (10) is anchored to a linear stage which is spring loaded to provide a slight tension on the fiber. A small dashpot (2) dampens unwanted motion and reduces fiber breakage due to any slight disturbance transmitted to the fiber. Heart of the alignment system is the squeezer (3) and a magnified front and side views of the squeezer are shown in FIGS. 4A and 4B. It consists of an L-shaped 303 stainless steel base (11), a pair of flexible hinges (12), and an upper jaw (13). The PZT element (14) may advantageously comprise, for example, a Z-cut lithium-niobate chip which is used to apply the AC stress on the fiber. By applying an alternating voltage to the metal electrodes deposited on the top and bottom surfaces of the chip the AC stress is generated. The bottom surface of the chip is grounded to the base plate and the top surface is covered with an aluminum plate which is connected to a BNC connector (15). The DC force needed for the squeezer (3) is obtained by supplying an electric current to a solenoid (4) which pushes a rod (34) bearing on the squeezer (3). The amount of force applied can be varied by adjusting the current. The rod (34) pushes a metal ball (36) mounted on top of the upper jaw (13) of the squeezer (3). Positioning of the squeezer (3) with respect to the fiber is accomplished using micrometer stages (6), (7), and (8).

Figure 5:
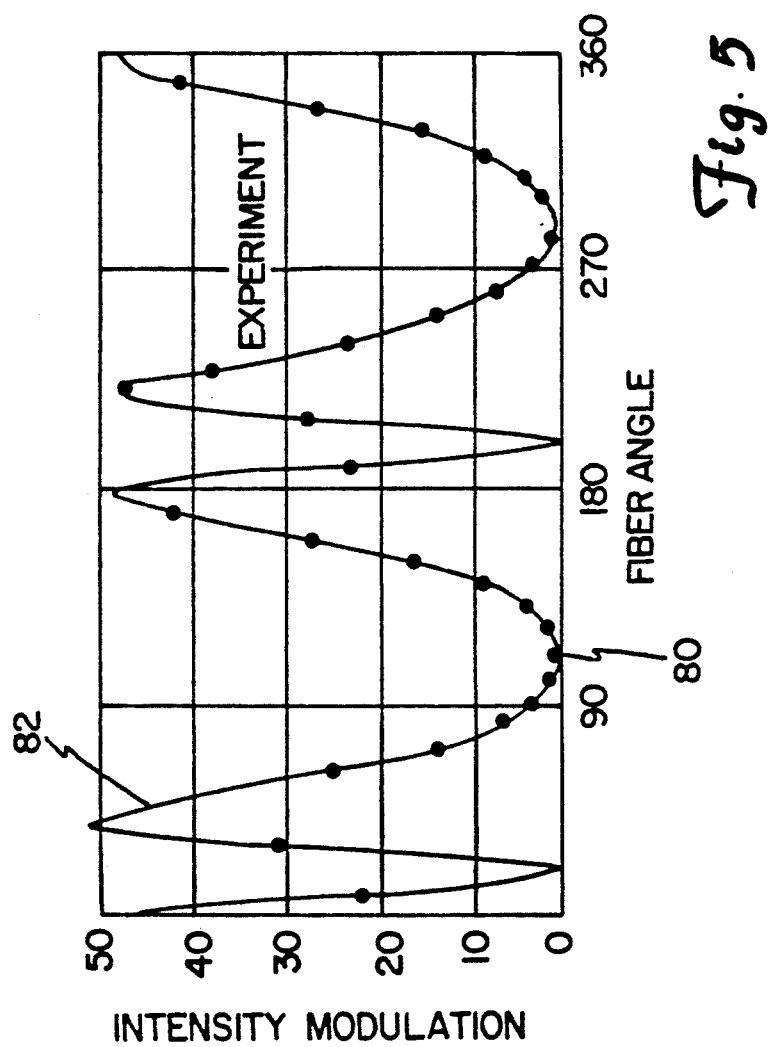
FIG. 5 shows a measured intensity modulation in $\mu$V at the output of the lock-in amplifier verses angle of the rotated fiber.

The detected output (71), which is amplified as shown in FIG. 1, goes through a series of maxima and minima as the fiber is rotated as shown graphically in FIG. 5. The curve (82) detailed in FIG. 5 is an experimental plot of one example of the invention. When the principal axis of the fiber (5) is aligned in the direction of the externally applied stress resulting from the squeezer (3), a null (80) in the detected output is observed. The slow or fast principal axis of the fiber is identified by the width of the null. Analytical results obtained from a theoretical model are in good agreement with the experimental result shown in FIG. 5.

Referring now to FIG. 11, after aligning the two fibers (5), they are clamped on to a rectangular window type frame (110) to maintain the correct alignment with respect to each other. FIG. 11 shows the two aligned fibers (5) fastened to the rectangular frame (110).

Coupler Fabrication System

Once the fibers are aligned according to the process described hereinabove, the coupler is ready for fusing to form an optical coupler. The apparatus and method of the invention provide for the steps of fusing, followed by tapering and then adjusting the polarization before finally mounting the finished coupler in a housing. The description below first details the equipment used and then describes the operation of the equipment for a better understanding of the invention.

Figure 2:
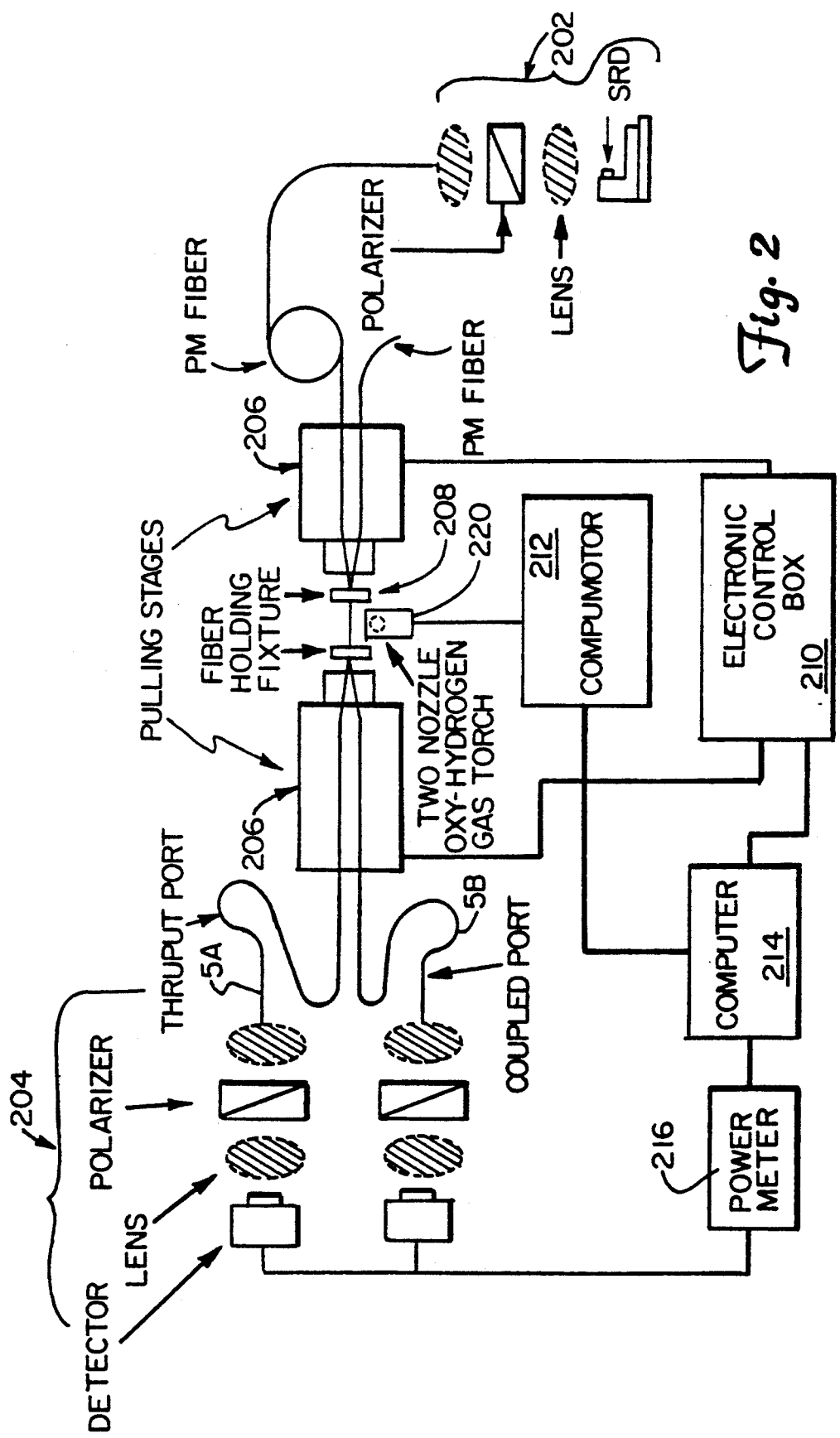
FIG. 2 shows a schematic block diagram of coupler fabrication system.

Referring now to FIG. 2 a coupler fabrication system as provided by the invention is shown including light launching optics (202) and detection optics (204), first and second horizontal pulling stages (206), a fiber holding fixture (208) used during the fusion process, an electronic control box (210) that controls the pulling stages (206), a two nozzle oxy-hydrogen micro gas-torch (220) driven by a compu-motor (212), and a computer (214). The computer (214) interfaces with a power meter (216) which is connected to the detection optics (204). The computer (214) may advantageously be a Hewlett Packard personal computer, for example.

Figure 6:
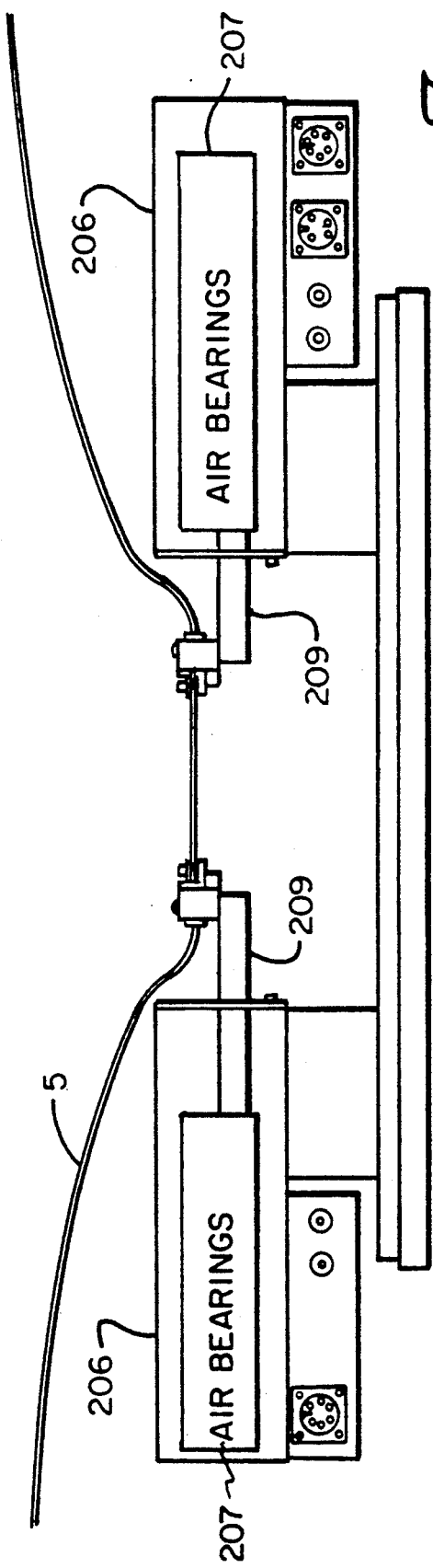
FIG. 6 shows assembled hardware of the coupler pulling station of the coupler fabrication system.
Figure 7:
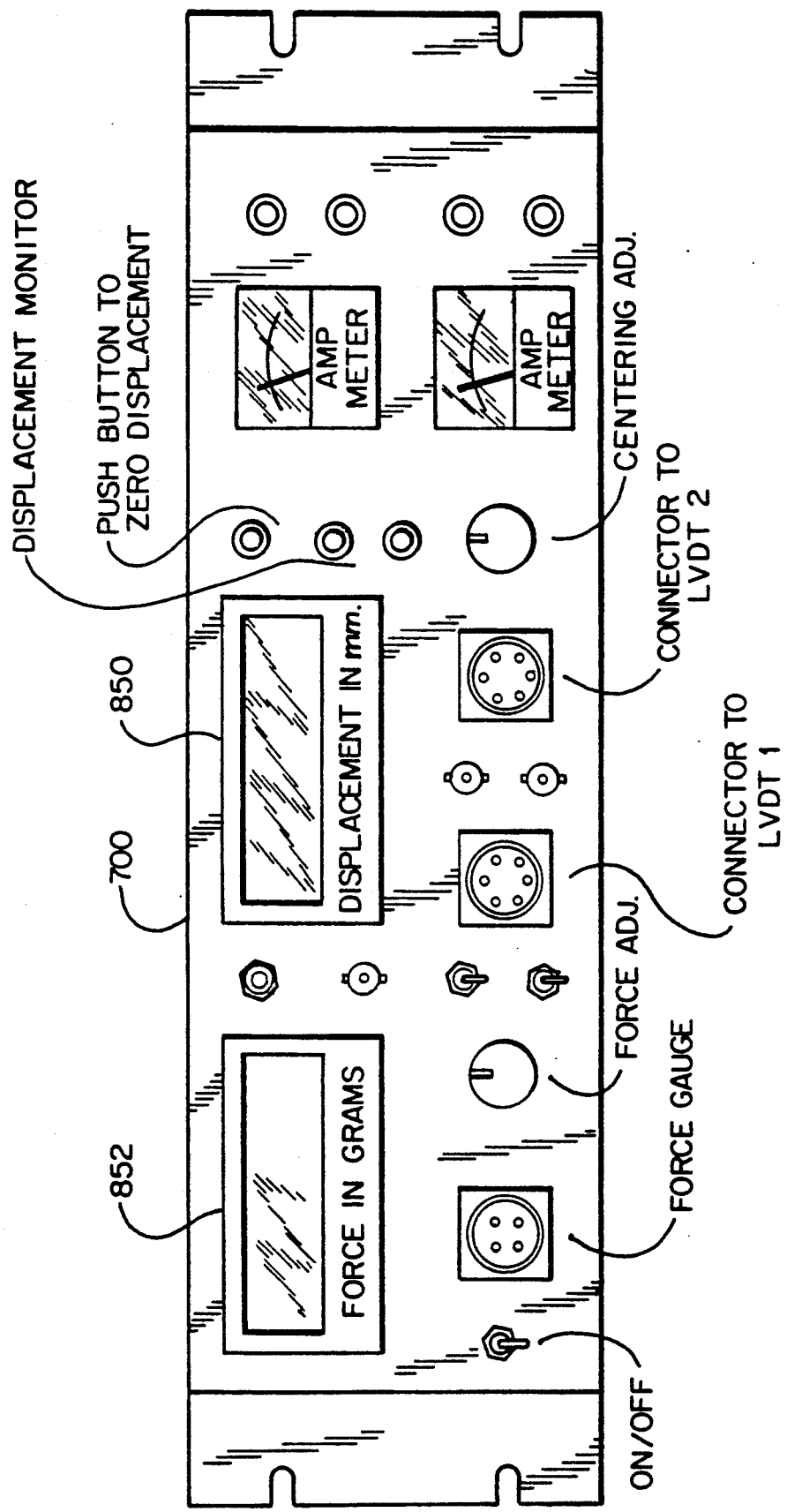
FIG. 7 shows a front panel of the electronic control box of the coupler fabrication system.
Figure 8:
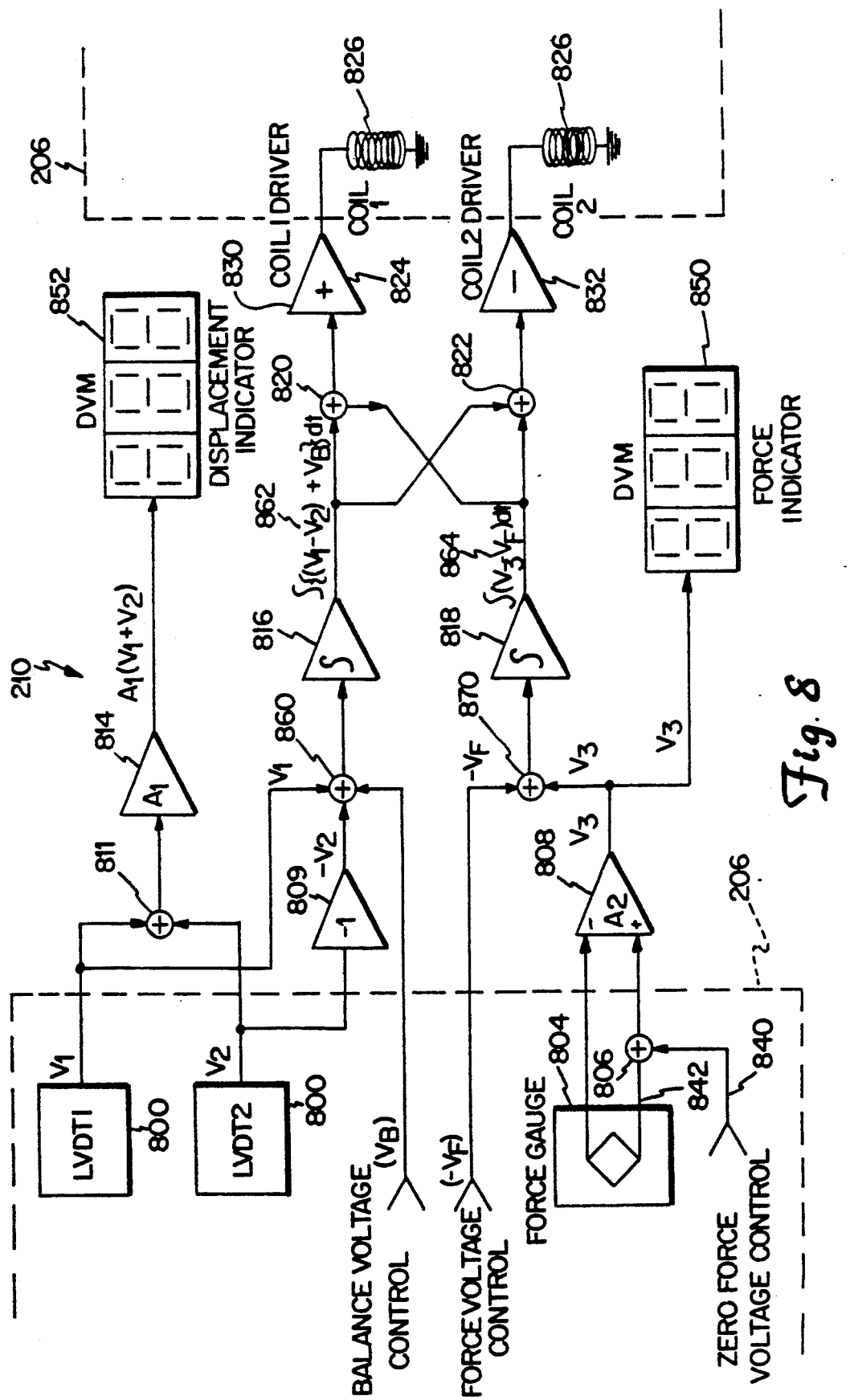
FIG. 8 shows a block diagram of the electronic control box of the coupler fabrication system.

The first and second horizontal coupler pulling stages (206) are shown in more detail in FIGS. 6 and 8. The first and second horizontal pulling stages (206) comprise air bearings (207), first and second linear variable differential transformers (LVDT's) (800) for determining the how much distance the fibers are pulled, first and second electromagnets (826) for supplying the needed force to pull the fibers (5), and a strain gauge or force gauge (804) to measure the force applied. These components are assembled within the first and second pulling stages (206). Silicone fluid with sliders attached to bars (209) which slide in the air bearings (207) advantageously provide dampening needed to stop unwanted oscillations.

Referring now particularly to FIG. 8, the electronic control box and its connections to the pulling stages are shown schematically. The electronic control box (210) allows the user to maintain a constant pulling force on the two sides of the coupler fibers as they are tapered. LVDT1 and LVDT2 provide two output voltages ($V_1$) and ($V_2$) that correspond to the position of sliding bars (209) of the pullers on the right and left sides. The voltages (V1) and (V2) are summed at summing point (811), amplified by a first amplifier (814) and displayed by the displacement indicator DVM (852). The difference of the two voltages ($V_1 - V_2$) is summed with a balance control voltage ($V_S$) at summing point (860) and then integrated through a first integrator (816). The output of the first integrator is a closed-loop displacement error signal (862) that controls first and second electromagnet coil drivers (824), (832) where the first and second coil drivers are of opposite polarity and drive first and second electromagnets (826), here represented by their coils.

The force measured by force gauge (804) provides a signal (842) that is dependent on the fiber pulling force The signal (842) is, in turn, summed with a zero force control voltage (840) and amplified by a second amplifier (808) to provide a voltage ($V_3$) which is displayed on a force indicator DVM (850). The difference between voltage (V3) and the force control voltage ($V_c$) is produced at summing point (870) and integrated by a second integrator (818) to produce a closed-loop force error signal (864). This signal summed with the displacement error signal (862) comprise a total control voltage which maintains a constant pulling force on the coupler fibers using the two coil drivers (824) and (832).

Figure 9:
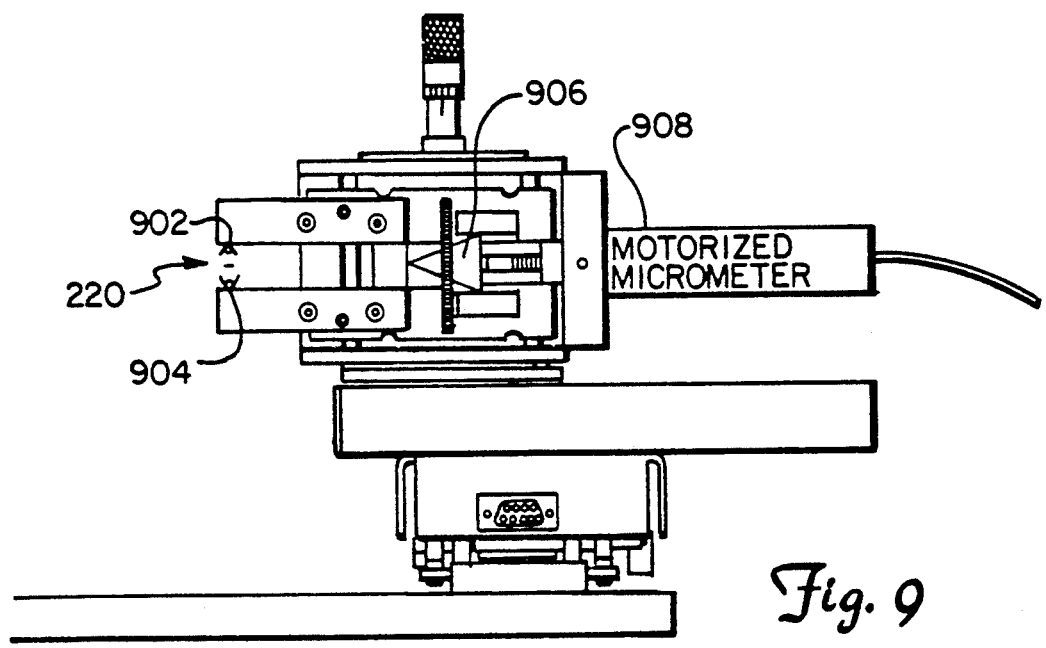
FIG. 9 shows an adjustable two nozzle oxy-hydrogen gas micro-torch for fusion and tapering of fibers of coupler fabrication system.

FIG. 9 shows the two nozzle oxy-hydrogen micro gas torch (220) used in one embodiment of the invention including top and bottom nozzles (902), (904) respectively. The separation between the top and bottom nozzles (902), (904) respectively is controlled by driving a triangular wedge (906) using a motorized micrometer (908). The torch (220) is driven on track and is interfaced with the compu-motor which in-turn is controlled by the HP-computer.

Figure 10:
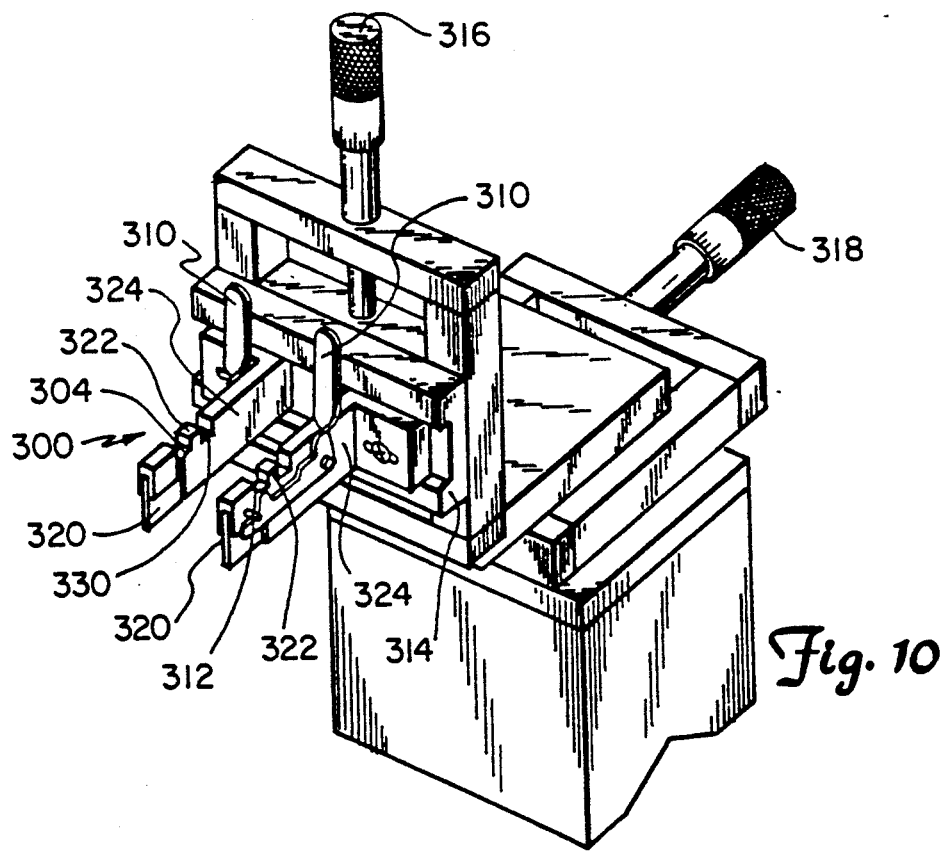
FIG. 10 shows a fiber holding and packaging fixture used during fusing of coupler fibers of the coupler fabrication system.

The fiber holding and packaging fixture for coupler fabrication (300) is shown in FIG. 10. A spring loaded pin (312) controls the position of the movable jaws (320). The plastic jacket stripped and perfectly cleaned optical fibers are brought in contact for fusion by bringing down from vertical to horizontal position of the levers (310). As the levers (310) are brought down the gap (304) becomes smaller holds the fibers in contact between movable jaws (320) are used to hold fused silica coupler housing during the packaging. The width between the two clamps (324) is adjustable using guiding and mounting plate (314). The up and down, and in and out positions of the fiber holding and packaging fixture is adjusted using the micrometer heads (316) and (318), respectively.

Fiber Fusion

Having described the major elements of the apparatus of the invention, the method of operation of the apparatus of the invention with respect to fusion, tapering and adjusting polarity will now be explained to provide a better understanding of the invention. Referring now to FIGS. 11 and 12, an important criterion for a successful coupler fabrication is that the stripped portions of the fibers must be cleaned thoroughly and maintained clean prior to and during the fusion and tapering process. The frame (110) with the two aligned fibers is carried to the fiber fusion-and-tapering station. The fibers (5) are examined under a microscope to determine the cleanliness of the fibers. If any dust particles are observed, they are gently removed by applying methanol with cotton Q-tip. The frame with the aligned fibers is then placed on the air bearing pullers (with no air supply to the bearings) of the fusion-and-tapering setup such that the fibers are positioned horizontally next to each other and clamped to the two rotatable stages that are attached to the pullers. The rectangular frame (110) is removed leaving the fibers suspended between the pullers with some tension. By using a small amount of epoxy (1220), for example, Norland #81UV Curable epoxy, the jackets of both fibers are glued together. The proximity of the epoxy from the stripped end is typically between 3-4mm. The central stripped sections (115) of the two fibers ar held together touching with the in-house developed adjustable fiber holding fixture (300). The fiber holding fixture (300) is capable of providing a contact between the two fibers under slight tension with no pulling force. FIG. 12 best shows the epoxied jackets of both fibers and the bare section of the fibers held together using the adjustable fiber holding fixture.

A dark line (1222) is usually observed indicating an intimate contact between the two clean fibers held by the adjustable fiber holding fixture. The dark line becomes a crucial factor in deciding the quality of fusion. A linearly polarized light is coupled to the throughput fiber (5A) as shown in FIG. 2 such that the axis of polarization is parallel to the fiber slow or fast axis. The polarization extinction ratio of the throughput fiber (5A) is determined by finding the difference between the maximum and the minimum detected powers, when the output polarizer is parallel and perpendicular to the input light, respectively.

The oxy-hydrogen micro torch (220) driven by the compu-motor (212) with two nozzles (902), (904) centered with respect to the bare fibers is brushed in ever decreasing steps over a range of amplitudes which usually range from 1.3 to 2.6 mm depending on the type of coupler fiber. The fibers are fused by bringing the two nozzles gradually closer to the fibers until a bright white glow is observed in both the fibers. The fusion process is stopped when the fused section of the fibers is close to the shape of a peanut. However, it must be noted that each type of the fiber has a window of fusion that is optimum for yielding low loss and high polarization extinction ratios in the output ports of a coupler. During fusion, the output power of the throughput fiber is monitored in order to detect any power loss due to bending of the fibers. In most cases no power loss is observed, and the fused fibers are ready to taper.

Fiber Tapering

The adjustable fiber holding fixture (300) is lowered and removed, and the fused fibers are rotated by 90 degrees. A force of about 0.3 grams is applied to the fibers by supplying the necessary current to the electromagnets in the pullers, and the needed air is supplied to puller bearings such that no friction is experienced by the sliders during the pulling process. The fused portion of the fibers is tapered with the oxy-hydrogen torch, which is brushed over an amplitude ranging from 2.6 to 3 mm depending on the type of fiber used and the degree of fusion. The separation between the nozzles of the oxy-hydrogen torch is adjusted for gradual tapering of the fibers. The fiber stretching rate, which is approximately equal to 2 mm/5 minutes, is maintained constant during the tapering process. The output power from the two fibers is monitored and stored in the computer. Tapering is stopped when the output power from the two output ports is equal, which generally occurs after a stretch of 5 to 8 mm depending on the strength of fusion.

A typical plot of the output power from the two parts verses tapering length is shown in FIG. 13. After the tapering process is completed, a preliminary testing of the coupler is done by measuring the excess loss and extinction ratios. The excess loss (L) of the coupler is given by:

$$L = -10 log[(P_1 + P_2)/P_t]$$

where $P_1$ is the throughput port output power, $P_2$ is the coupled port power and $P_t$ is total power originally launched into the fiber. Here the power is expressed in watts. The polarization extinction ratios of the output ports of the coupler are determined by using the equation:

$$E.R. = (P_f - P_s)$$

where $P_s$ and $P_f$ are minimum and maximum powers in dB, respectively.

After tapering and when the tapered coupler has cooled, the jaws holding the coupler are rotated independently to vary the stress within the coupler and shift the polarization from one fiber to the other to further adjust the extinction ratio, if necessary. Once the optimum extinction ratio has been found, the coupler is held in that position by the fixturing until assembled in a coupler housing.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. An apparatus for fabrication of a fused fiber optic coupler using first and second optical fibers, the apparatus comprising:
   means for holding the first and second optical fibers under tension but with no pulling force in contact along a portion of a length of the fibers resulting in a contact portion;
   a heat source; and
   means for fusing the first and second optical fibers, the fusing means including means for brushing the heat source across the contact portion of the first and second fibers and means for moving the heat source in ever decreasing steps gradually closer to the fibers and over an amplitude.

2. An apparatus according to claim 1, wherein each of the first and second optical fibers has a jacket, the jackets of the first and second optical fiber being removed along the contact portion.

3. An apparatus according to claim 1 wherein the heat source comprises an oxy-hydrogen torch having two nozzles, one nozzle positioned on each side of the contact portion; and further wherein the brushing means comprises a motor connected to move the two nozzles across the fibers and a computer connected to control the motor to move the two nozzles in ever decreasing steps gradually closer to the fibers and over an amplitude.

4. An apparatus according to claim 3 further comprising:
   light launching optics coupled to transmit light through the first optical fiber;
   light detecting optics coupled to detect light transmitted through the first and second optical fibers and generating an output representative thereof; and
   means coupled to the output of the light detecting optics and connected to the computer for monitoring and storing power measurements of the light transmitted through the fibers.

5. An apparatus according to claim 1, further comprising means for tapering the fused fiber optic coupler wherein the first and second optical fibers are fused together along the contact portion, the tapering means comprising:
   means for holding the fused fiber optic coupler;
   means for heating the fused fiber optic coupler, the heating means including means for brushing a heat source across the contact portion and means for moving the heat source over an amplitude as the heat source is brushed across the fibers of the fused fiber optic coupler;
   means for controlling the brushing and moving means, the controlling means including means for controlling adjustment of a separation of the heat source and the fused optical coupler;
   means for maintaining a substantially frictionless constant pulling force on the first and second optical fibers of the fused fiber optic coupler;
   light launching optics coupled to transmit light through the first optical fiber of the fused fiber optic coupler;
   light detecting optics coupled to the first and second optical fibers and to generate power outputs for each of the first and second optical fibers of the fused fiber optic coupler representative thereof;
   means for monitoring the power outputs; and
   means coupled to the monitoring means for controlling the constant pulling force to stop the constant pulling force when the power output from each of the fibers is substantially equal.

6. An apparatus for use in tapering a fused optical coupler, the fused optical coupler including first and second optical fibers, each of the optical fibers having a principle axis, the first and second optical fibers being fused together along a common contact length, the apparatus comprising:

means for holding the fused optical coupler;

a heat source;

means for moving the heat source across the common contact length;

means for moving the heat source over an amplitude as the heat source is brushed across the fibers;

means for controlling the brushing and moving means, the controlling means including means for controlling adjustment of a separation of the heat source and the fused optical coupler;

means for maintaining a substantially frictionless constant pulling force on the first and second optical fibers of the fused optical coupler as the heat source is brushed across the common contact length, the maintaining means including first and second opposing air bearings having sliding bars for applying the constant pulling force on the first and second optical fibers;

light launching optics coupled to transmit light through the first optical fiber of the fused optical coupler;

light detecting optics coupled to the first and second fibers to detect light transmitted through the first and second optical fibers and to generate power outputs for each of the first and second optical fibers of the fused optical coupler representative thereof;

means for monitoring the power outputs; and means coupled to the monitoring means for controlling the constant pulling force to stop the constant pulling force when the power output from each of the fibers is substantially equal.

7. An apparatus according to claim 6, wherein the means for maintaining a constant pulling force further comprises:

first and second LVDT's coupled to the first and second opposing air bearings, respectively, each of the first and second LVDT's providing outputs corresponding to the position of the first and second opposing air bearing sliding bars;

a force guage coupled to the air bearings to measure the applied force and generating a force output representative thereof; and a first and second electromagnet for pulling the fibers by applying a force to the first and second opposing air bearings, respectively, as a function of the outputs of the LVDT's and the force output.

8. An apparatus according to claim 6, wherein the light launching optics include a super-radiant diode (SRD).

9. A method for fabricating a fused optical coupler utilizing first and second optical fibers having a jacket thereon, the method comprising the steps of:

holding the first and second optical fiber in a predetermined alignment under slight tension with no pulling force, the first and second optical fibers each including a stripped portion of predetermined length without the jacket, the stripped portions of the fibers being held in contact along a portion of their predetermined length resulting in a contact portion; and heating the first and second optical fibers by brushing a heat source across the contact length of the first and second fibers in ever decreasing steps and gradually moving the heat source closer to the fibers over an amplitude as the heat source is brushed across the fibers.

10. The method according to claim 9, wherein the heating step comprises the step of operating a two nozzle oxy-hydrogen torch and bringing the two nozzles, one on each side of the contact portion, gradually closer to the fibers as the contact portion is brushed.

11. A method according to claim 9, further comprising the steps of:

launching light through the first optical fiber which is held in contact with the second optical fiber;

detecting the light transmitted through the first and second optical fibers and generating light detecting outputs representative thereof; and monitoring the light detecting outputs to detect power loss.

12. A method for tapering a fused optical coupler, the fused optical coupler including first and second optical fibers, each optical fiber having a principle axis, the optical fibers being fused together along a common contact length, the method comprising the steps of:

holding the fused optical coupler in a predetermined orientation;

heating the fused optical coupler by brushing a heat source across the common contact length of the fused optical coupler and moving the heat source over an amplitude as the heat source is brushed across the fibers;

controlling the brushing and moving of the heat source;

maintaining a substantially frictionless constant pulling force on the first and second optical fibers of the fused optical coupler;

launching light through the first optical fiber which is coupled to the second optical fiber;

detecting output power of the light transmitted through the first and second optical fibers and generating for each fiber a light detecting output representative thereof;

monitoring the light detecting output and controlling the constant pulling force to stop the constant pulling force when the output power from each of the fibers is substantially equal.

13. A method according to claim 12, wherein the heating step further comprises the step of operating a two nozzle oxy-hydrogen torch, one nozzle of each side of the common contact length, and adjusting a separation between the two nozzles.

14. An apparatus for fabrication of a fiber optic coupler, the fiber optic coupler including first and second optical fibers, the apparatus comprising:

means for holding the first and second optical fibers in a first orientation and under slight tension but with no pulling force in contact along a portion of a length of each fiber resulting in a contact portion;

a heat source;

means for fusing the fibers, the fusing means including means for brushing the heat source across the contact portion of the first and second optical fibers and means for moving the heat source in ever decreasing steps gradually closer to the fibers and over an amplitude until fusion of the fibers is complete resulting in a fused optical coupler;

means for monitoring the fused optical coupler to detect power loss resulting from the fusing step;

means for rotating the fused optical coupler through a predetermined angle from the first orientation;

means for tapering the fused optical coupler, the tapering means including:

means for brushing the heat source across the contact portion;

means for moving the heat source over an amplitude as the heat source is brushed across the first and second optical fibers;

means for controlling the moving and brushing means, the controlling means including means for controlling adjustment of a separation between the heat source and the fused optical coupler;

means for maintaining a constant pulling force on the first and second optical fibers of the fused optical coupler as the brushing means heats the contact portion;

light launching optics coupled to the fibers to transmit light through the first optical fiber of the fused optical coupler;

light detecting optics coupled to the first and second optical fibers to detect light transmitted through the first and second optical fibers and to generate power outputs for each of the first and second optical fibers of the fused optical coupler representative thereof;

means for monitoring the power outputs;

means coupled to the monitoring means for controlling the constant pulling force to stop the constant pulling force when the power output from each of the fibers is substantially equal.

15. A method for fabricating a fiber optic coupler utilizing first and second optical fibers having a jacket thereon, the method comprising the steps of:

holding the first and second optical fibers in a first orientation, the first and second fibers each including a stripped portion of predetermined length without the jacket, the stripped portions of each fiber being held in contact along a portion of the predetermined length forming a contact portion;

fusing the first and second optical fibers along the contact portion by brushing a heat source across the contact portion of the first and second optical fibers and moving the heat source in ever decreasing steps gradually closer to the fibers and over an amplitude until fusion of the fibers is complete forming a fused fiber optic coupler;

monitoring the fused fiber optic coupler to detect power loss resulting from the fusing step;

rotating the fused fiber optic coupler through a predetermined angle into a second orientation;

tapering the fused fiber optic coupler, the tapering step comprising the steps of:

brushing a heat source across the contact portion of the fused fiber optic coupler;

controlling the brushing and moving;

maintaining a substantially frictionless constant pulling force on the first and second optical fibers of the fused fiber optic coupler;

launching light through the first optical fiber which is coupled to the second optical fiber;

detecting output power of the light transmitted through the first and second optical fibers and generating for each fiber a light detecting output representative thereof; and monitoring the light detecting outputs and controlling the constant pulling force to stop the constant pulling force when the output power from each of the fibers is substantially equal.

* * * * *

UNITED STATES PATENT AND TRADEMARK OFFICE
CERTIFICATE OF CORRECTION

PATENT NO. : 5,224,977
DATED : 6 July 1993
INVENTOR(S) : Yellapu Anjan, Sam Habbel, Joseph Straceski It is certified that error appears in the above-identified patent and that said Letters Patent is hereby corrected as shown below:

Column 1, line 16, cancel "i"

Column 5, line 27, cancel "($V_S$)" and substitute --($V_B$)--

Column 5, line 36, period missing at end of sentence

Column 5, line 41, cancel "($V_i$)" and substitute --($V_F$)--

Column 6, line 33, cancel "ar" and substitute --are--

Column 8, line 14, add --,-- after Claim 1

Column 8, line 23, add --,-- after Claim 3

Column 12, add --moving the heat source over an amplitude as the heat source is brushed across the fibers; -- between lines 20 and 21.

Signed and Sealed this

Third Day of May, 1994

Attest:

BRUCE LEHMAN

Attesting Officer

Commissioner of Patents and Trademarks